US010891629B1

(12) United States Patent
Barakat et al.

(10) Patent No.: US 10,891,629 B1
(45) Date of Patent: Jan. 12, 2021

(54) SYSTEMS AND METHODS FOR MATCHING A CUSTOMER WITH A SERVICE REPRESENTATIVE

(71) Applicant: Wells Fargo Bank, N.A., San Francisco, CA (US)

(72) Inventors: Wayne Barakat, Novato, CA (US); Thomas E. Gross, San Anselmo, CA (US); Darius Miranda, San Francisco, CA (US); Marria Wairmola Rhodriquez, San Francisco, CA (US); Andres J. Saenz, Redmond, WA (US); Sadie Salim, Albany, CA (US); Duc M. Trinh, Golden Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 176 days.

(21) Appl. No.: 15/600,463

(22) Filed: May 19, 2017

Related U.S. Application Data

(60) Provisional application No. 62/492,077, filed on Apr. 28, 2017.

(51) Int. Cl.
*G06Q 30/00* (2012.01)
*H04M 3/493* (2006.01)
*G06F 16/435* (2019.01)
*G06F 16/432* (2019.01)

(52) U.S. Cl.
CPC ......... *G06Q 30/016* (2013.01); *G06F 16/433* (2019.01); *G06F 16/435* (2019.01); *H04M 3/493* (2013.01)

(58) Field of Classification Search
CPC ..................................................... G06Q 10/10
See application file for complete search history.

(56) References Cited

U.S. PATENT DOCUMENTS

| 5,930,764 | A | 7/1999 | Melchione et al. |
| 6,134,530 | A | 10/2000 | Bunting et al. |
| 7,321,870 | B1 | 1/2008 | Comiskey et al. |
| 7,401,040 | B2 | 7/2008 | Sloan et al. |
| 7,409,364 | B1 | 8/2008 | Barton et al. |
| 8,660,876 | B2 | 2/2014 | Woodings et al. |
| 8,792,631 | B2 | 7/2014 | Addair |
| 2002/0188497 | A1 | 12/2002 | Cerwin |
| 2005/0213743 | A1* | 9/2005 | Huet ............ G06Q 10/10 379/265.09 |
| 2006/0215824 | A1* | 9/2006 | Mitby ............ G10L 15/22 379/100.05 |

(Continued)

*Primary Examiner* — Dennis W Ruhl
(74) *Attorney, Agent, or Firm* — Foley & Lardner LLP (57) ABSTRACT

This disclosure provides systems and methods for matching a customer with a service representative. A request for service can be received from a customer. A first service interaction can be initiated between the customer and a first service representative. A customer sentiment metric can be determined during the first service interaction. The customer sentiment metric can indicate a level of customer satisfaction during the first service interaction. A second service representative suitable for fulfilling the customer's request for service can be identified, based at least in part on the customer sentiment metric. A second service interaction can be initiated between the customer and the second service representative, responsive to the identification of the second service representative.

11 Claims, 4 Drawing Sheets

(56) References Cited

U.S. PATENT DOCUMENTS

| | | |
|---|---|---|
| 2010/0211428 A1 | 8/2010 | Duffy et al. |
| 2011/0235797 A1* | 9/2011 | Huet ................ G06Q 10/10 379/265.09 |
| 2012/0130763 A1 | 5/2012 | Katz |
| 2013/0051545 A1 | 2/2013 | Ross et al. |
| 2014/0379340 A1* | 12/2014 | Timem .............. G06F 21/32 704/246 |
| 2016/0006871 A1* | 1/2016 | O'Connor .......... H04M 3/5175 379/265.05 |
| 2017/0243303 A1* | 8/2017 | Doddmani Manjunath ............. G06Q 50/01 |
| 2018/0139326 A1* | 5/2018 | Kalathur ............ H04M 3/5232 |

* cited by examiner

SYSTEMS AND METHODS FOR MATCHING A CUSTOMER WITH A SERVICE REPRESENTATIVE

CROSS-REFERENCE TO RELATED APPLICATIONS

This application claims priority to U.S. Provisional Patent Application No. 62/492,077 entitled "SYSTEMS AND METHODS FOR MATCHING A CUSTOMER WITH A SERVICE REPRESENTATIVE," by Wayne Barakat et al., filed on Apr. 28, 2017, which is herein incorporated by reference in its entirety and for all purposes.

TECHNICAL FIELD

Embodiments of the present disclosure generally relate to the field of providing customer service.

BACKGROUND

Customers of an organization such as a business entity may want to interact with a representative of the organization to ask questions or address problems related to a product or service provided by the organization. Some such service interactions may take place as voice calls or text-based chats. In some instances, the customer may not be satisfied after speaking with a first service representative. There may be other representatives better suited to helping the customer, but it can be difficult to identify such representatives and to initiate further service interactions between the customer and the more suitable representatives.

SUMMARY

One example embodiment relates to a method for matching a customer with a service representative. The method includes receiving, by a service interaction circuit, a request for service from a customer. The method includes initiating, by the service interaction circuit, a first service interaction between the customer and a first service representative, responsive to receiving the request for service from the customer. The method includes determining, by a virtual assistant circuit, a customer sentiment metric during the first service interaction. The customer sentiment metric indicates a level of customer satisfaction during the first service interaction. The method includes identifying, by a profile management circuit, a second service representative suitable for fulfilling the customer's request for service, based at least in part on the customer sentiment metric. The method includes initiating, by the service interaction circuit, a second service interaction between the customer and the second service representative, responsive to the identification of the second service representative.

Another example embodiment relates to a system for matching a customer with a service representative. The system includes a service interaction circuit configured to receive a request for service from a customer, and to initiate a first service interaction between the customer and a first service representative, responsive to receiving the request for service from the customer. The system includes a virtual assistant circuit configured to determine a customer sentiment metric during the first service interaction. The customer sentiment metric indicates a level of customer satisfaction during the first service interaction. The system includes a profile management circuit configured to identify a second service representative suitable for fulfilling the customer's request for service, based at least in part on the customer sentiment metric. The service interaction circuit is further configured to initiate a second service interaction between the customer and the second service representative, responsive to the identification of the second service representative.

Another example embodiment relates to a non-transitory computer-readable medium having instructions encoded thereon which, when executed by one or more processors, cause the one or more processors to perform a method for matching a customer with a service representative. The method includes receiving a request for service from a customer. The method includes initiating a first service interaction between the customer and a first service representative, responsive to receiving the request for service from the customer. The method includes determining a customer sentiment metric during the first service interaction. The customer sentiment metric indicates a level of customer satisfaction during the first service interaction. The method includes identifying a second service representative suitable for fulfilling the customer's request for service, based at least in part on the customer sentiment metric. The method includes initiating a second service interaction between the customer and the second service representative, responsive to the identification of the second service representative.

These and other features, together with the organization and manner of operation thereof, will become apparent from the following detailed description when taken in conjunction with the accompanying drawings.

DETAILED DESCRIPTION

The present disclosure is generally directed to systems and methods for matching a customer with a service representative. Customers of an organization may want to interact with a representative of the organization to ask questions or address problems related to a product or service provided by the organization. For example, a customer of a bank may wish to speak with a representative of a bank to ask a question about a financial account maintained by the customer. In some instances, the customer may be dissatisfied during a first service interaction with a first service representative. There may be other representatives better suited to helping the customer, but it can be difficult to identify such representatives and to initiate further service interactions between the customer and the more suitable representatives.

According to various example embodiments, as described further below, a system is configured to match service representatives with customers. In some arrangements, the system can be maintained by a financial institution. The system can receive a request for service from a customer, and can initiate a first service interaction between the customer and a first service representative. For example, in some arrangements the system initiates a voice call between the customer and the first service representative. In some other arrangements, the system initiates a text-based online chat between the customer and the first service representative. The system determines a customer sentiment metric indicating a level of satisfaction of the customer. In some arrangements, the customer sentiment metric can be continuously or periodically updated while the first service interaction is in progress. In some arrangements, the customer sentiment metric is formatted as a numerical score, and the system compares the numerical score to a threshold and makes a determination of when the score falls below the threshold, indicating that the customer is experiencing a predetermined level of frustration or dissatisfaction.

After determining that the customer is frustrated or dissatisfied, the system identifies a second service representative who may be more suitable for fulfilling the customer's request. For example, the second service representative may hold a more senior position within the organization than the first representative, or may have more experience related to the topic of the customer's inquiry than the first representative. The system then initiates a second service interaction between the customer and the second service representative. For example, in some arrangements the system transfers the voice call or text-based chat corresponding to the first service interaction from the first service representative to the second service representative. In some other arrangements, the system joins the second service representative to the voice call or text-based chat, so that the customer can interact with the first representative and the second representative simultaneously.

Figure 1:
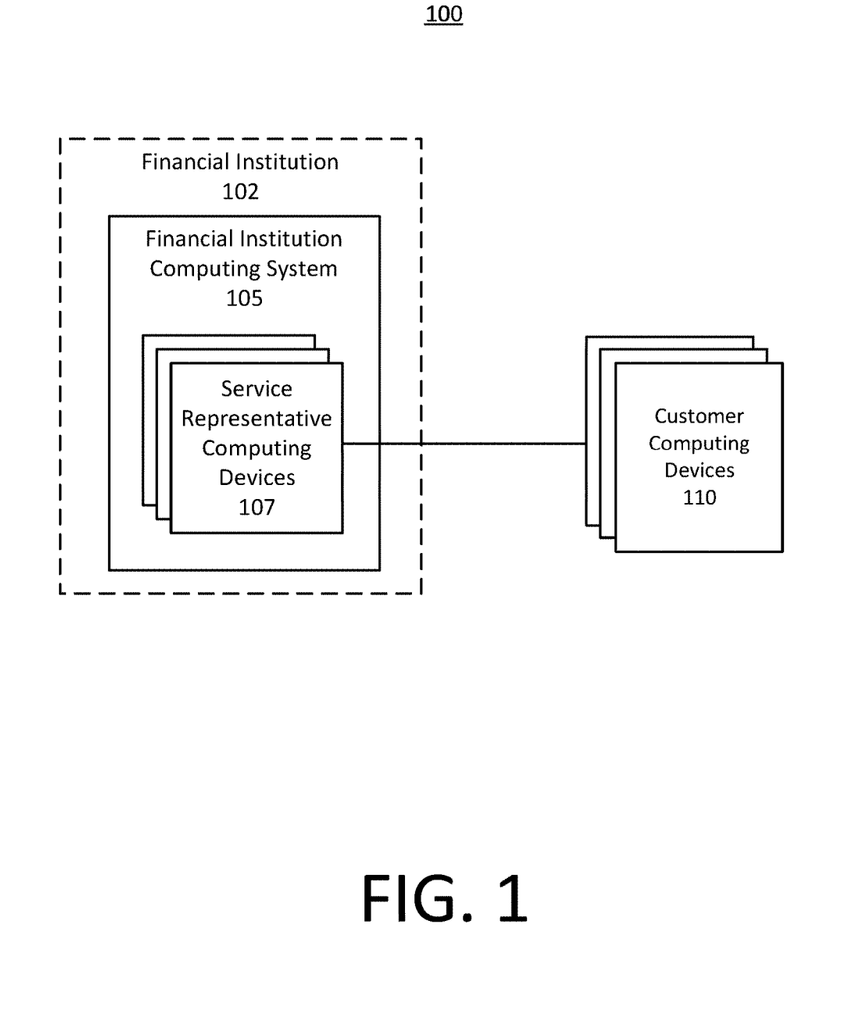
FIG. 1 is a block diagram of a computing environment for matching a customer with a service representative, according to an example embodiment.

FIG. 1 is a block diagram of a computing environment 100 for matching a customer with a service representative. The environment 100 includes a financial institution computing system 105 (including a plurality of service representative computing devices 107) and a plurality of customer computing devices 110. The customer computing devices 110 are communicatively coupled to the financial institution computing system 105. According to some embodiments, the system 100 facilitates the matching of customers with respective service representatives at the financial institution 102. For example, each customer computing device 110 can be associated with a respective customer of the financial institution 102, and each service representative computing device 107 can be associated with a respective service representative at the financial institution 102.

In some arrangements, a customer may use a customer computing device 110 request a service, such as asking a question or requesting other information regarding a product or service offered by the financial institution 102. As described herein, the customer computing device 110 used to send the request can be connected to a respective service representative computing device 107, such that the customer and the respective service representative can conduct a first service interaction in which the first service representative attempts to fulfill the customer's request. The financial institution computing system 105 can include components described in detail below that determine a sentiment metric associated with the customer during the first service interaction, such as a level of frustration or dissatisfaction that the customer is experiencing during the first service interaction. The financial institution computing system 105 can then identify a second service representative who may be more suitable for fulfilling the customer's request than the first service representative, and can initiate a second service interaction between the customer and the second service representative. For example, the financial institution computing system 105 can initiate the second service interaction by communicatively coupling the customer computing device 110 to the particular service representative computing device 107 associated with the second service representative.

Figure 2:
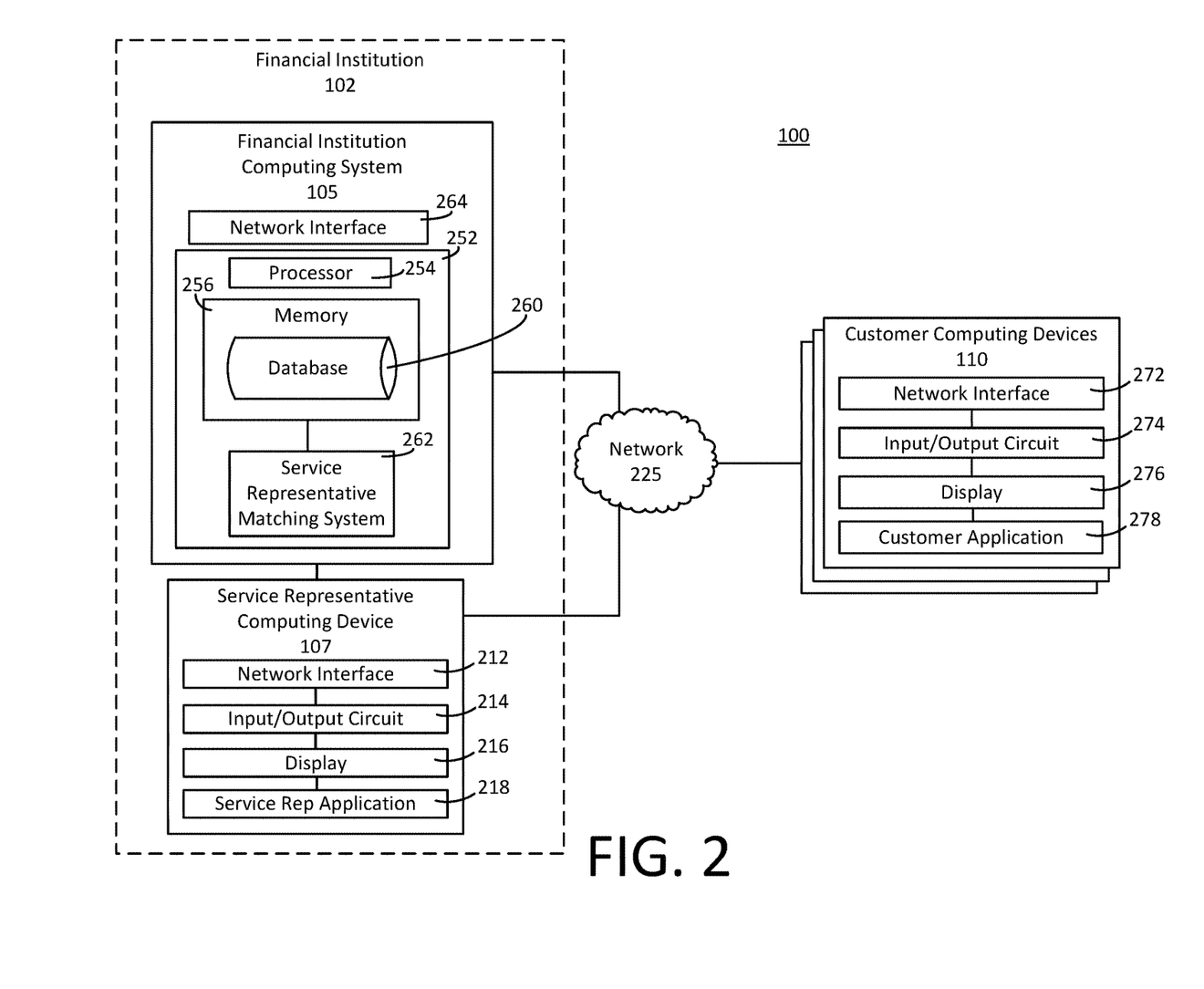
FIG. 2 is a detailed schematic diagram of the computing environment of FIG. 1, according to an example embodiment.

Referring now to FIG. 2, a detailed schematic diagram of the computing environment 100 of FIG. 1 is shown. The components of the computing environment 100, such as the financial institution computing system 105 and the customer computing devices 110 are communicatively coupled to one another via a network 225. In some arrangements, the network 225 includes any of a wired and wireless network. In the wireless configuration, the network 225 may include any of the Internet, a private network, a wide area network (WAN), or a combination thereof. It should be understood that, although only a single network 225 is shown in FIG. 2 for illustrative purposes, in some arrangements the components of the computing environment 100 are interconnected to one another via two or more interconnected computer networks that may be combined to implement the network 225. Further, in some embodiments, a proprietary banking network may be implemented, whereby the proprietary banking network includes one or more security mechanisms (e.g., cryptography, firewalls, etc.) that enable the creation and maintenance of a secure or relatively secure communication protocol between the components of FIGS. 1 and 2. All such variations are intended to fall within the scope of the present disclosure. A description of the components of FIGS. 1 and 2 is provided below.

In some arrangements, the customer computing devices 110 are computing devices associated with individual users or small groups of users (e.g., a family, a group of friends, or a business), where each user is an individual customer of the financial institution 102. Each of the customer computing devices 110 may be any type or form of computing device owned by, operated by, accessed by, or otherwise associated with a respective customer. In some arrangements, each of the customer computing devices 110 is at least one of a server, a desktop computer, or a laptop computer (i.e., a predominantly stationary computing system). In some other arrangements, each of the customer computing devices 110 is a mobile computing device such as a tablet computing device or a handheld computing device, such as a smartphone. It should be understood that the aforementioned list of mobile and predominantly stationary computing devices is not meant to be limiting, as the present disclosure contemplates any type of mobile and/or predominantly stationary computing device as falling within the scope of the "customer computing device 110."

In this example, each customer computing device 110 includes a network interface 272, an input/output circuit 274, a display 276, and a customer application 278. The network interface 272 of the customer computing device 110 is adapted for and configured to establish a communication session via the network 225 with the financial institution computing system 105 and the service representative computing devices 107. Accordingly, the network interface 272 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 276 is structured to present, provide, or otherwise communicate information to a user of the customer computing device 110. The information may include, but is not limited to, account information, transaction information, customer service information, and the like. In this regard, the display 276 is communicably and operatively coupled to the input/output circuit 274 to provide a user interface for receiving and displaying information on the customer computing device 110. The input/output circuit 274 is structured to receive and provide communication(s) to a user of the customer computing device 110. In this regard, the input/output circuit 274 is structured to exchange data, communications, instructions, etc., with an input/output component of the customer computing device 110. Accordingly, in some arrangements, the input/output circuit 274 includes input/output devices such as any of a display device, a touchscreen, a keyboard, and a microphone. In other arrangements, the input/output circuit 274 includes communication circuitry for facilitating the exchange of data, values, messages, and the like between an input/output device and the other components of the customer computing device 110. In still other arrangements, the input/output circuit 274 includes any combination of hardware components (e.g., a touchscreen), communication circuitry, and machine-readable media necessary to perform these functions.

The customer application 278 is communicably coupled to the financial institution computing system 105 via the network 125, and may be structured to implement a variety of functionality. For example, in some arrangements, the customer application 278 is specifically configured to allow a user to receive customer service information. In this regard, the customer application 278 may allow the user to interact with any of the service representative computing devices 107 to make inquiries and receive responses from various service representatives. Thus, the customer application 278 may include a text-based chat application that allows a user to provide and transmit text-based queries to the service representative computing devices 107, and allows the user to view text-based responses received from the service representative computing devices 107. Accordingly, the customer application 278 can be configured to display one or more graphical user interfaces (GUIs), via the display 276, to provide such information to the user.

In some arrangements, the customer application 278 can also permit completion of financial transactions such as transfers of funds between accounts or withdrawals of funds. In some arrangements, the customer application 278 may provide displays indicative of current account balances, accrued financial rewards, pending transactions, profile information (e.g., identification information for the user, interests of the user, contact information for the user), and the like. Further, in some arrangements, the customer application 278 may also permit payments to and/or from the user to a designated recipient (e.g., a merchant or another individual). Thus, the customer application may allow the user to perform a variety of online banking transactions. In this regard, the customer application can be an application developed by the financial institution 102 to allow the user of the customer computing device 110 to perform a variety of online banking or other purchasing transactions using accounts held at the financial institution 102. The customer application 278 also can be a web browser application that allows a user to access an online banking area of a website hosted by the financial institution computing system 105.

The financial institution computing system 105 is configured to help a customer to be matched with an appropriate service representative during one or more service interactions. The customer may be a user of one of the customer computing devices 110. The financial institution computing system 105 can maintain financial accounts and other financial products, information, or services associated with a plurality of customers. For example, financial accounts such as savings accounts, checking accounts, credit card accounts, or any other form of account can be maintained at the financial institution 102. In some arrangements, the financial institution computing system 105 receives service requests relating to the accounts, products, information or other services it maintains from the customers via the customer computing devices 110. Requests for services can be initiated by customers via the customer computing devices 110, for example using the customer application 278 as described above. For each service request, the financial institution computing system 105 allows the customer to conduct a service interaction with a service representative. The financial institution computing system 105 then monitors customer sentiment during the service interaction and, if the user appears to be dissatisfied, frustrated, or unhappy during the service interaction, the financial institution computing system 105 identifies a second service representative who may be better able to fulfil the customer's request for service and initiates a second service interaction between the customer and the second service representative.

The financial institution computing system 105 may be owned by, operated by, or otherwise associated with the financial institution 102 which, in some arrangements, may include a group of financial institutions. A financial institution, such as financial institution 102, may be any entity capable of providing one or more financial products or services. In this regard, the financial institution 102 may include, but is not limited to, a banking institution, a mortgage providing institution, a lending institution, a payment processing institution, a manufacturing institution that manufactures financial products (e.g., payment cards), any combination thereof, and so on. Accordingly, "financial institution" is meant to be broadly interpreted herein.

As shown, the financial institution computing system 105 includes a processing circuit 252 having a processor 254 and a memory 256. The processor 254 may be implemented as a general-purpose processor, an application-specific integrated circuit (ASIC), one or more field programmable gate arrays (FPGAs), a digital signal processor (DSP), a group of processing components, or other suitable electronic processing components. The one or more memory devices 256 (e.g., RAM, NVRAM, ROM, Flash Memory, hard disk storage, etc.) may store data and/or computer code for facilitating the various processes described herein. Moreover, the one or more memory devices 256 may be or include tangible, non-transient volatile memory or non-volatile memory. Accordingly, the one or more memory devices 256 may include database components such as the database 260, object code components, script components, or any other type of information structure for supporting the various activities and information structures described herein.

The financial institution computing system 105 further includes a network interface 264, which establishes connections with other components of the environment 100 by way of the network 225. The network interface 264 includes program logic that facilitates connection of the financial institution computing system 105 to the network 225. The network interface 264 supports communication between the financial institution computing system 105 and other systems, such as the service representative computing devices 107 and the customer computing devices 110. For example, in some arrangements the network interface 264 includes at least one of a cellular modem, a Bluetooth transceiver, a radio-frequency identification (RFID) transceiver, and an NFC transmitter. In some arrangements, the network interface 264 includes the hardware and machine-readable media sufficient to support communication over multiple channels of data communication. Further, in some arrangements, the network interface 264 includes cryptography capabilities to establish a secure or relatively secure communication session with customer computing devices 110. In this regard, financial data (or other types of data, such as customer service data) may be encrypted and transmitted to prevent or substantially prevent the threat of hacking.

The financial institution computing system 105 further includes a database 260. The database 260 is configured to hold, store, categorize, and otherwise serve as a repository for information related to financial accounts and transactions conducted by users of the customer computing devices 110 (i.e., customers of the financial institution 102), as well as other information relating to various attributes of the users of the customer computing devices 110. For example, the database 260 may store financial transaction data (e.g., an account associated with a transaction, a dollar amount of the transaction, and identities of the counterparties to the transaction) as well as contextual information relating to the transaction. The database 260 also stores information related to financial rewards that may be associated with each of the accounts. Financial rewards may include any type or form of value that can be earned by an account holder by performing certain actions. In some arrangements, the database 260 also stores customer information such as demographic information and/or location information, as well as service interaction history information. For example, service interaction history information can include any information related to previous service interactions conducted by customers, such as questions asked, answers received, service representatives involved in each service interaction, and customer satisfaction level for each service interaction. In some arrangements, such information can be maintained in a plurality of customer profiles each associated with a respective customer. In some arrangements, the database 260 also stores profile information for each service representative in a respective service representative profile. For example, demographic information, financial information, and information relating to the service interactions conducted by the service representatives can be stored in the service representative profiles maintained in the database 260.

The database 260 is structured to selectively provide access to information relating to financial transactions, accounts, customer service information, and other information to the users of the customer computing devices 110 the service representative computing devices 107, and other components of the financial institution computing system 105. In this regard, as discussed further herein, the database 260 is communicably and operatively coupled to a service representative matching system 262 to provide access to such information. Although shown as being part of the memory 256 in FIG. 2, the database 260 may be separate from the memory 256 and may be a stand-alone component of the financial institution computing system 105. The service representative matching system 262 is configured to facilitate the matching of customers with suitable service representatives to facilitate service interactions. The service representative matching system 262 is described further below in connection with FIG. 3.

The service representative computing devices 107 include any types of computing device suitable for use by a sales representative during the course of service interactions with a customer. In some embodiments, the service representative computing devices 107 are operated by the financial institution 102. The service representative computing devices 107 are configured to allow service representatives to receive service requests from customers, to interact with the customers during the course of the service interactions to provide responses to customer queries, and to allow the service representatives to access any relevant customer information during the service interactions. The service representative computing devices 107 are configured to communicate with the Financial institution computing system 105 to perform these various functions. In this regard, the service representative computing device 107 is communicably and operatively coupled to the Financial institution computing system 105.

Each service representative computing device 107 includes a network interface 212, an input/output (I/O) circuit 214, a display 216, and a service representative application 218. The network interface 212 of the service representative computing device 107 is adapted for and configured to establish a communication session via the network 225 with the financial institution computing system 105 and/or the customer computing devices 110. Accordingly, the network interface 212 includes any of a CDMA, GSM, or LTE transceiver, a wireless network transceiver (e.g., 802.11X, ZigBee, Bluetooth, etc.), or a combination thereof (e.g., both a cellular transceiver and a Bluetooth transceiver). In some embodiments, the network interface 212 communicates via a secured wired connection within a branch of the financial institution 102.

The display 216 is used to present, provide, or otherwise communicate information to a user (i.e., a service representative) of the service representative computing device 107. The information may include, but is not limited to, account information, transaction information, customer identification information, customer queries, and the like to service representatives on the service representative computing device 107. In this regard, the display 216 is communicably and operatively coupled to the input/output circuit 214 to provide a user interface for receiving and displaying information on the service representative computing device 107.

The input/output circuit 214 is structured to receive and provide communication(s) to a user of the service representative computing device 107. In this regard, the input/output circuit 214 is structured to exchange data, communications, instructions, etc., with an input/output component of the service representative computing device 107. Accordingly, in some arrangements, the input/output circuit 214 includes an input/output device such as a display device (e.g., display 216), a touchscreen, a keyboard, and a microphone. In some arrangements, the input/output circuit 214 may include communication circuitry for facilitating the exchange of data, values, messages, and the like between an input/output device and the components of the service representative computing device 107. In still another embodiment, the input/output circuit 214 may include any combination of hardware components (e.g., a touchscreen), communication circuitry, and machine-readable media necessary for performing these functions.

The service representative application 218 may be structured to implement a variety of functionality. For example, in some arrangements, the service representative application 218 is specifically configured to allow a service representative to provide customer service information to a customer during the course of a service interaction. In this regard, the service representative application 218 may allow the service representative to interact with any of the customer computing devices 110 to receive customer service inquiries and provide responses. Thus, the service representative application 218 may include a text-based chat application that allows a service representative to provide and transmit text-based responses to the customer computing devices 110 in response to customer queries received from the customer computing devices 110. In some arrangements, the service representative application 218 also can be configured to provide an indication of customer sentiment during the course of a service interaction. The customer sentiment can be provided as a customer sentiment metric, and can be updated continuously or periodically in real time throughout a service interaction. In some arrangements, when the customer sentiment indicates that that the customer is becoming dissatisfied, the service representative application 218 also can be configured to provide a notification to the service representative that a second service representative should interact with the customer to provide a better experience for the customer. The service representative application 218 can provide an identification of the second service representative, as well as a mechanism for allowing the service representative to connect the customer to the second service representative (e.g., by transferring a voice call to the second representative). Accordingly, the service representative application 218 can be configured to display one or more graphical user interfaces (GUIs), via the display 276, to provide such information to the service representative.

Figure 3:
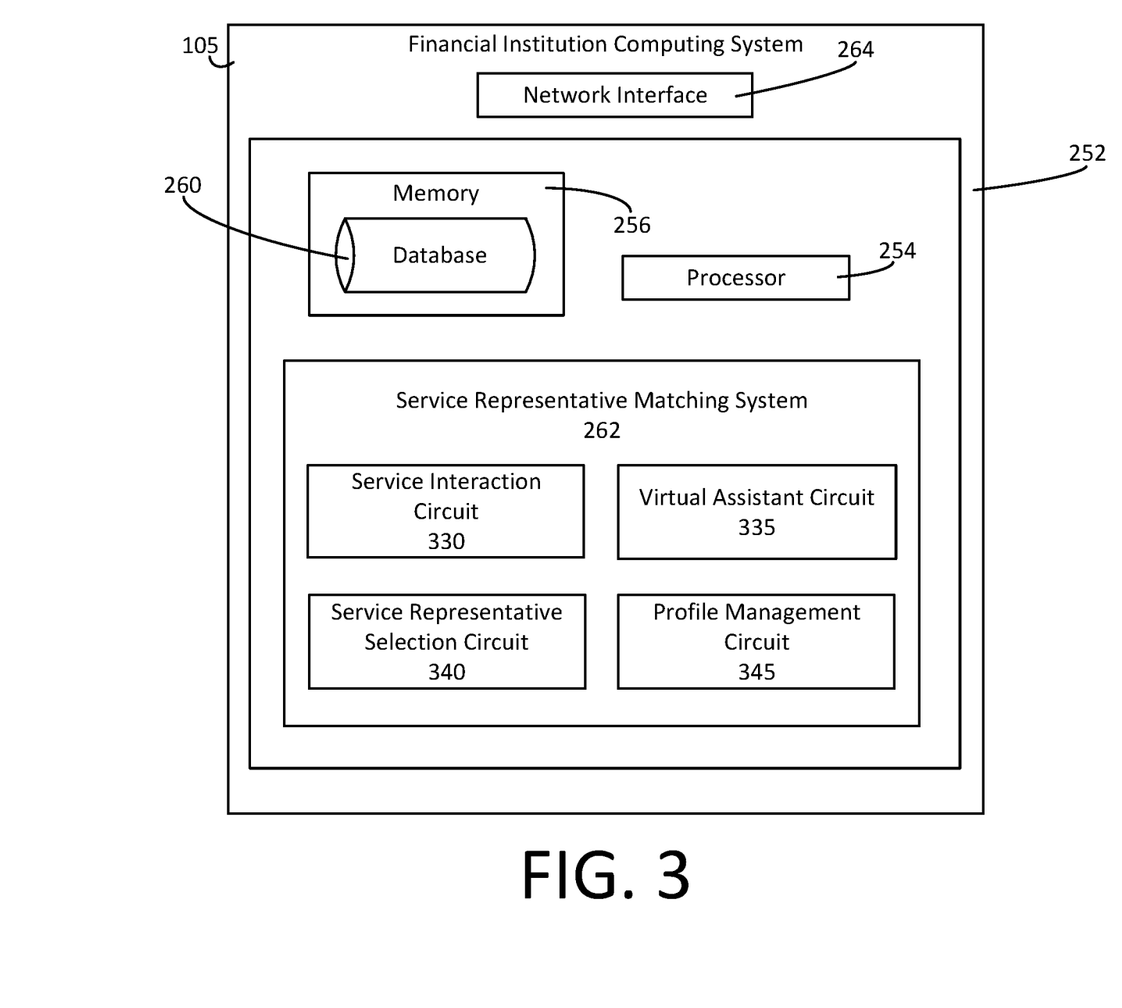
FIG. 3 is detailed schematic diagram of a financial institution computing system, including a service representative matching system, included in the environment of FIG. 2, according to an example embodiment.

Referring now to FIG. 3, a detailed schematic diagram of the service representative matching system 262 and part of the financial institution computing system 105 included in the environment 100 of FIG. 2 is shown, according to an example embodiment. The service representative matching system 262 is shown to include a service interaction circuit 330, a virtual assistant circuit 335, a service representative selection circuit 340, and a profile management circuit 345. It should be understood that other arrangements of the service representative matching system 262 may include more or fewer circuits without departing from the spirit and scope of this disclosure. Furthermore, in some arrangements, the functionality of one or more circuits may be combined into a single circuit and/or into circuits separate from the processing circuit 252. Within the financial institution computing system 105, the service representative matching system 262 is operably and communicatively coupled to the database 260 and the processor 254. FIG. 3 is described with reference to FIGS. 1 and 2 below.

The service interaction circuit 330 is configured to receive a request for service from a customer. A customer may send a request for service when the customer has a question about a product or service offered by the financial institution 102. For example, the customer may have a question about a recent transaction within a financial account held by the customer at the financial institution 102, and may send a request for service to get the question answered. In some arrangements, the customer may send the request for service from a device such as the customer computing device 110 shown in FIGS. 1 and 2.

In some arrangements, the request for service received by the service interaction circuit 330 is formatted as an Internet-based electronic request, such as a hypertext transfer protocol (HTTP) request. For example, the financial institution computing system 105 can act as a server hosting a website configured to receive HTTP requests for information corresponding to a customer service web page. The service interaction circuit 330 can detect such requests, and can determine that a customer sending such a request wants to interact with a service representative. In some other arrangements, the request for service received by the service interaction circuit 330 is formatted in a different manner. For example, the request for service can be in the form of a voice call to a predetermined telephone number maintained by the financial institution 102 for the purpose of providing customer service. The service interaction circuit 330 can be configured to detect such voice calls.

In some arrangements, the service interaction circuit 330 also can be configured to initiate a service interaction between the customer and a service representative. The service interaction circuit 330 can initiate the service interaction in response to receiving the request for service. In implementations in which the request for service corresponds to a voice call received from the customer, the service interaction circuit 330 can initiate the service interaction, for example, by transferring the voice call to a phone number associated with a service representative. In some implementations, the service representative may receive the phone call via a device such as the service representative computing device 107 shown in FIGS. 1 and 2. In some other arrangements, for example in which the request for service is formatted as an Internet-based request, the service interaction circuit 330 can initiate the service interaction by connecting the customer to the service representative in an online text-based chat application that allows the customer and the service representative to communicate with one another. In some arrangements, such an application may correspond to one or both of the customer application 278 and the service representative application 218 shown in FIG. 2. Generally, the service interaction circuit can initiate the service interaction in any manner that permits the customer to interact with the service representative such that the customer may ask questions or request information, and the service representative can provide replies to the customers questions and requests.

The virtual assistant circuit 335 is configured to monitor an emotional response of the customer during a service interaction. In some arrangements, the virtual assistant determines a customer sentiment metric during a service interaction. Generally, the customer sentiment metric can be any type of information relating to the customer's feelings of happiness, contentedness, satisfaction, frustration, anger, agreeableness, or any other emotion experienced by the customer during the service interaction. In some arrangements, the virtual assistant circuit 335 determines the customer sentiment metric as a numerical value or other form of score. For example, the virtual assistant circuit 335 can determine a number between zero and 100 representing the customer's level of satisfaction during the service interaction, with higher numbers corresponding to a higher levels of satisfaction.

In some arrangements, the virtual assistant circuit 335 can determine the customer sentiment metric based on the content of the statements made by the customer and a service representative during a service interaction. For example, the virtual assistant circuit 335 can include speech recognition functionality that processes the statements made by the customer and the service representative during a voice call. The virtual assistant circuit 335 uses information such as word choice and tone of voice to determine whether the customer is satisfied with the service interaction. For example, if the customer speaks with a tone of voice indicating satisfaction with the service interaction, the virtual assistant circuit 335 can determine a relatively high value for the customer sentiment metric. On the other hand, if the customer speaks with an angry tone of voice or uses negative words (e.g., profanities) during the service interaction, the virtual assistant circuit 335 can determine a relatively low value for the customer sentiment metric. Similar functionality can be employed by the virtual assistant circuit 335 to monitor service interactions that are conducted in a different format. For example, the virtual assistant circuit 335 can monitor word choice employed by the customer in a text-based chat, and can use the word choice to determine the customer sentiment metric. In some arrangements, the virtual assistant circuit 335 can implement artificial intelligence, such as a trained model, that uses information corresponding to previous service interactions to more accurately determine a customer sentiment metric.

In some arrangements, the virtual assistant circuit 335 monitors a service interaction, and updates the customer sentiment metric continuously or periodically over the course of the service interaction. Thus, the virtual assistant circuit 335 can determine changes in the satisfaction level or other emotional response of the customer over time. The virtual assistant circuit 335 also can compare the customer sentiment metric to a predetermined threshold value. For example, in some arrangements the predetermined threshold value can be equal to the average value of all service interactions that have previously been conducted with customers of the financial institution 102. If the customer sentiment metric falls below the predetermined threshold, the virtual assistant circuit 335 can provide an alert or a notification to the service representative to inform the service representative that the customer is dissatisfied with the service interaction.

If the virtual assistant circuit 335 determines that the customer's satisfaction level is too low (e.g., the customer sentiment metric falls below the predetermined threshold during the first service interaction), the service representative selection circuit 340 can identify a second service representative to handle the customer's request. The service representative selection circuit 340 can identify the second service representative from among a plurality of available representatives. In some arrangements, the service representative selection circuit 340 identifies the second service representative as one of the plurality of representatives who is likely to be able to resolve the customer's question or problem to a higher degree of satisfaction, relative to the first service representative. For example, the service representative selection circuit 340 may select a service representative having a higher level of seniority or more authority than the second service representative. In another example, the service representative selection circuit 340 can identify a representative having expertise in a particular field that is of interest to the customer. In some arrangements, the service representative selection circuit 340 can select the second service representative based on similarities between the customer and the second service representative, such as similar demographic information.

The profile management circuit 345 is configured to maintain customer profiles and service representative profiles. Each customer profile can correspond to a respective one of the customers of the financial institution 102, and each service representative profile can correspond to a respective one of the service representatives employed by or otherwise associated with the financial institution. The profile management circuit 345 can store various attributes, including demographic data, financial data, and customer service data in each of the profiles.

In some arrangements, the profile management circuit 345 can be configured to collect data to be stored in a customer profile when a new customer opens an account or purchases services from the financial institution. For example, a new customer may be prompted to supply information such as the customer's age, address, gender, and income level when the customer opens a new financial account, and the profile management circuit 345 can store this information in a customer profile for the new customer. Similarly, the service representatives can be asked to provide such information as a condition of their employment, and the information can be stored in respective service representative profiles for each service representative.

In some arrangements, the profile management circuit 345 also can update the customer profiles and service representative profiles over time. For example, at the conclusion of a service interaction between a customer and a service representative, the profile management circuit 345 can update the respective customer profile and service representative profile to include an indication that the service interaction occurred, as well as an indication of whether the service interaction was generally positive or negative (e.g., as determined by the customer sentiment metric at the end of the service interaction). In some implementations, if a customer profile indicates that the customer had a positive service interaction with a particular service representative, the profile management circuit 345 can identify that service representative as the first service representative with whom the customer should interact during a subsequent service interaction when the customer requests service in the future.

Figure 4:
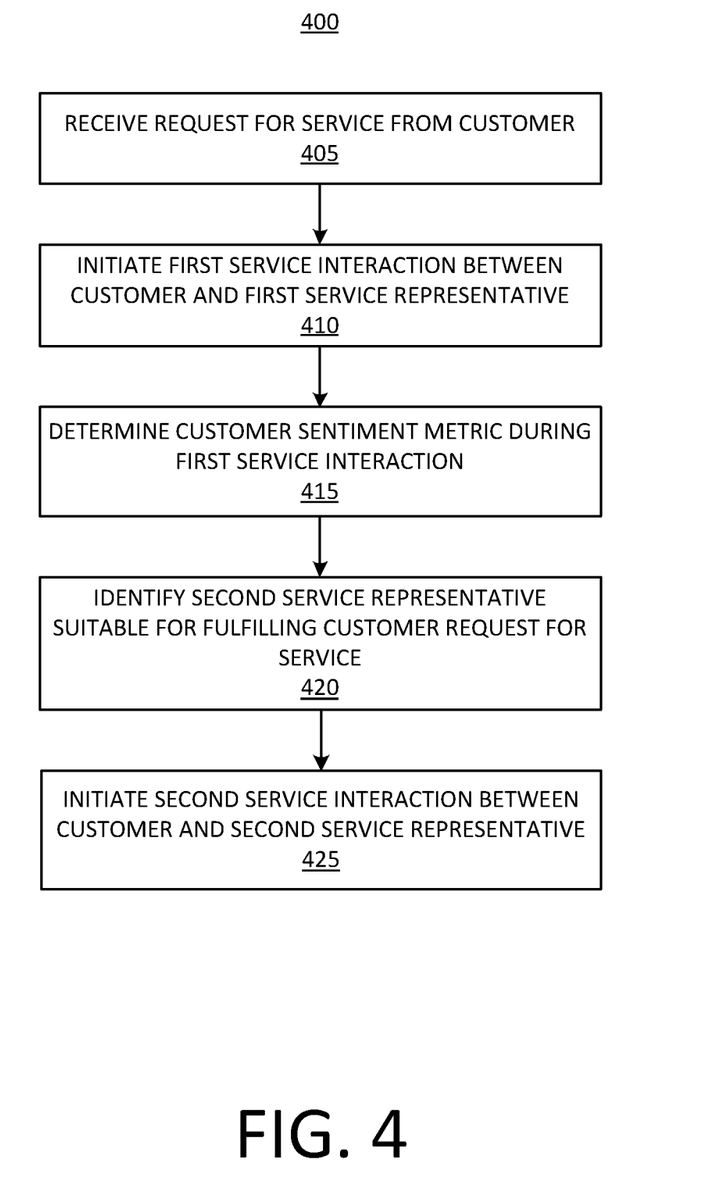
FIG. 4 is a flowchart illustrating a method for matching a customer with a service representative, according to an example embodiment.

FIG. 4 is a flowchart illustrating an example method 400 for matching a customer with a service representative, according to an example embodiment. The method 400 is performed by the financial institution computing system 105 shown in FIGS. 1 and 2. Accordingly, in arrangements where the financial institution computing system 105 is part of a financial institution (e.g., the financial institution 102 as shown in FIGS. 1 and 2), the method 400 may be performed by the financial institution. Generally, through the method 400, the a customer requesting service is matched with service representatives to increase the customers level of satisfaction with a service interaction.

The method 400 begins a request for service is received from a customer at 405. In some arrangements, this is performed by a service interaction circuit such as the service interaction circuit 330 shown in FIG. 3. The customer may send the request for service when the customer has a question about a product or service offered by the financial institution. For example, the customer may have a question about a recent transaction within a financial account held by the customer at the financial institution 102, and may send a request for service to talk with a service representative who can answer the question. In some arrangements, the customer may send the request for service from a device such as the customer computing device 110 shown in FIGS. 1 and 2.

In some arrangements, the request for service is formatted as an Internet-based electronic request, such as an HTTP request. In some other arrangements, the request for service can be in the form of a voice call to a predetermined telephone number maintained by the financial institution 102 for the purpose of providing customer service. In still other arrangements, the request for service can be received in the form of an email sent by the customer to the financial institution. In general, the request for service can be received in any suitable manner that allows the financial institution to become aware that the customer would like to interact with a service representative.

A first service interaction is initiated between the customer and a first service representative at 410. In some implementations, this can be performed by the service interaction circuit that also performs the step of receiving the customer's request for service. In implementations in which the request for service corresponds to a voice call received from the customer, the first service interaction can be initiated by transferring the voice call to a phone number associated with the first service representative. The first service representative may receive the phone call via a device such as the service representative computing device 107 shown in FIGS. 1 and 2. In some other arrangements, for example in which the request for service is formatted as an Internet-based request, the first service interaction can be initiated by connecting the customer to the first service representative in an online text-based chat application that allows the customer and the first service representative to communicate with one another. Generally, the first service interaction can be initiated in any manner that permits the customer to interact with the first service representative such that the customer may ask questions or request information, and the first service representative can provide replies to the customers questions and requests.

It should also be noted that, in some arrangements, the method 400 can include identifying the first service representative based on a similarity between the first service representative and the customer. For example, in some arrangements, a profile can be maintained for the customer and for each of a plurality of service representatives, as described above. The method 400 can include comparing information in the customer profile to information in the plurality of service representative profiles to select a service representative whose profile includes information (e.g., demographic information) similar to that included in the customer profile. That service representative can then be identified as the first service representative for the first service interaction.

A customer sentiment metric is determined during the first service interaction at 415. The customer sentiment metric can be any type of metric relating to the customer's feelings, such as satisfaction with the service interaction, or any other emotion experienced by the customer during the first service interaction. In some arrangements, this can be performed by a virtual assistant circuit such as the virtual assistant circuit 335 shown in FIG. 3. The customer sentiment metric can be determined as a numerical value or other form of score. For example, a number between zero and 100 representing the customer's level of satisfaction during the first service interaction can be determined, with higher numbers corresponding to a higher levels of satisfaction. In other arrangements, any other form of numerical scale can be used. For example, the customer sentiment metric can be determined as an integer between one and five, or between one and ten.

The customer sentiment metric can be determined based on the content of the statements made by the customer and the first service representative during the first service interaction. For example, speech recognition software can be used to process the statements made by the customer and the first service representative during a voice call. Information such as word choice and tone of voice can be extracted from the audio of the voice call to determine whether the customer is satisfied with the first service interaction. For example, if the customer uses complimentary words or speaks with a tone of voice indicating satisfaction with the first service interaction, a relatively high value for the customer sentiment metric can be determined. On the other hand, if the customer speaks with an angry tone of voice or uses negative or insulting words (e.g., profanities) during the first service interaction, a relatively low value for the customer sentiment metric can be determined. Similar functionality can be used to monitor service interactions that are conducted in a different format. For example, word choice employed by the customer in a text-based chat or email exchange can be monitored, and can be used to determine the customer sentiment metric.

A second service representative suitable for fulfilling the customer's request for service can be identified at 420. In some arrangements, this can be performed by a service representative selection circuit such as the service representative selection circuit 340 shown in FIG. 3. In some arrangements, the second service representative is identified responsive to a determination that the customer service metric for the first service interaction is too low (e.g., below a predetermined minimum threshold). The second service representative can be identified from among a plurality of available service representatives. In some arrangements, the second service representative is identified as one of the plurality of representatives who is likely to be able to resolve the customer's question or problem to a higher degree of satisfaction, relative to the first service representative. For example, a service representative having a higher level of seniority or more authority than the second service representative can be identified as the second service representative. In another example, the a service representative having special expertise in a particular field that is of interest to the customer can be identified as the second service representative. In some arrangements, the second service representative can be selected based on similarities between the customer and the second service representative, such as similar demographic information.

A second service interaction between the customer and the second service representative is initiated at 425. In some arrangements, this can be performed by a service interaction circuit such as the service interaction circuit 340 shown in FIG. 3, and can be performed in a manner similar to that described above with respect to initiation of the first service interaction. It should be understood that, in some arrangements, the first service interaction can be terminated prior to or simultaneous with the initiation of the second service interaction. However, in some other arrangements, initiation of the second service interaction can occur prior to an end of the first service interaction. For example, during a voice call between the customer and the first service representative, the second service representative can be joined into the call before the first service representative ends the call. This can allow both the first service representative and the second service representative to interact with the customer simultaneously.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for matching a customer with a service representative, the method comprising:
    maintaining, by a service representative selection circuit, a customer profile including at least one attribute of a customer;
    maintaining, by the service representative selection circuit, a plurality of service representative profiles each associated with a respective one of a plurality of service representatives including at least a first service representative;
    detecting, by a service interaction circuit, a voice call from a customer communications device of the customer;
    selecting, by a profile management circuit, a first representative communications device of the first service based in part on a similarity between the customer profile and the service representative profile of the first service representative, responsive to detecting the voice call;
    transferring, by the service interaction circuit, the voice call to the first representative communications device of the first service representative;
    extracting, by a virtual assistant circuit executing speech recognition software that is analyzing an audio stream of the voice call, a tone of voice based on a statement made by the customer during the voice call;
    generating, by the virtual assistant circuit executing the speech recognition software and based on the statement and the tone of voice, a customer sentiment metric during the voice call, the customer sentiment metric indicating a level of customer satisfaction during the voice call
    in response to determining that the customer sentiment metric is below a predetermined threshold, identifying, by the profile management circuit, a suitable second service representative based at least in part on the customer sentiment metric and based on a similarity between the customer profile and a service representative profile of the suitable second service representative;
    transmitting, by the virtual assistant circuit, a notification to the first-representative communications device including information identifying the suitable second service representative;
    joining, by the service interaction circuit, a second representative communications device of the suitable second service representative to the voice call,
    responsive to the identification of the suitable second service representative, wherein joining the second representative communications device to the voice call occurs prior to an end of the voice call, such that the voice call includes the customer and both the first service representative and the suitable second service representative for a period of time.

2. The method of claim 1, wherein determining the customer sentiment metric comprises determining, by the virtual assistant circuit, a numerical score indicative of the level of customer satisfaction.

3. The method of claim 2, further comprising:
updating, by the virtual assistant circuit, the numerical score at least once during the voice call to determine an updated numerical score;
comparing, by the virtual assistant circuit, the updated numerical score to a threshold value; and
joining, by the service interaction circuit, the second representative communications device to the voice call based at least in part on a determination that the updated numerical score is below the threshold value.

4. The method of claim 1, further comprising updating, by the service representative selection circuit, the customer profile based on an outcome of the voice call.

5. A system for matching a customer with a service representative, the system comprising:
a service representative selection circuit configured to:
maintain a customer profile including at least one attribute of a customer;
maintain a plurality of service representative profiles each associated with a respective one of a plurality of service representatives including at least a first service representative and a second service representative; and
detect a voice call from a customer communications device of the customer;
a profile management circuit configured to:
select a first representative communications device of the first service representative based in part on a similarity between the customer profile and the service representative profile of the first service representative, responsive to detecting the voice call; and
transfer the voice call to the first representative communications device of the first service representative,
a virtual assistant circuit configured to:
execute speech recognition software that analyzes an audio stream of the voice call to extract a tone of voice based on a statement made by the customer during the voice call; and
generate, using the speech recognition software and based on the statement and the tone of voice, a customer sentiment metric during the voice call,
the customer sentiment metric indicating a level of customer satisfaction during the voice call; and
the profile management circuit further configured to identify, in response to determining that the customer sentiment metric is below a predetermined threshold, a suitable second service representative, based at least in part on the customer sentiment metric and based on a similarity between the customer profile and a service representative profile of the suitable second service representative,
wherein the virtual assistant circuit is further configured to transmit a notification to the first representative communications device including information identifying the suitable second service representative,
wherein the service interaction circuit is further configured join a second representative communications device of the suitable second service representative, responsive to the identification of the suitable second service representative,
wherein joining the second representative communications device to the voice call occurs prior to an end of the, voice call, such that the voice call includes the customer and both the first service representative and the suitable second service representative for a period of time.

6. The system of claim 5, wherein the virtual assistant circuit is configured to determine the customer sentiment metric as a numerical score indicative of the level of customer satisfaction.

7. The system of claim 6, wherein:
the virtual assistant circuit is further configured to:
update the numerical score at least once during the voice call to determine an updated numerical score; and
compare the updated numerical score to a threshold value; and
the service interaction circuit is further configured to join the second representative communications device to the voice call based at least in part on a determination that the updated numerical score is below the threshold value.

8. A non-transitory computer-readable medium having instructions encoded thereon which, when executed by one or more processors, cause the one or more processors to perform a method for matching a customer with a service representative, the method comprising:
maintaining a customer profile including at least one attribute of a customer;
maintaining a plurality of service representative profiles each associated with a respective one of a plurality of service representatives including at least a first service representative;
detecting a voice call from a customer communications device of the customer;
selecting a first representative communications device of the first service representative in part on a similarity between the customer profile and the service representative profile of the first service representative,
responsive to detecting the voice call transferring the voice call to the first representative communications device of the first service representative;
extracting, via speech recognition software that is analyzing an audio stream of the voice call, a tone of voice based on a statement made by the customer during the voice call,
generating, using the speech recognition software and based on the statement and the tone of voice, a customer sentiment metric during the voice call, the customer sentiment metric indicating a level of customer satisfaction during the voice call;
in response to determining that the customer sentiment metric is below a predetermined threshold, identifying a suitable second service representative based at least in part on the customer sentiment metric and based on a similarity between the customer profile and a service representative profile of the suitable second service representative;
transmitting a notification to the first representative communications device including information identifying the suitable second service representative; and
joining a second representative communications device of the suitable second service representative to the voice call, responsive to the identification of the suitable second service representative,
wherein joining the second representative communications device occurs prior to an end of the voice call, such that the voice call includes the customer and both the first service representative and the suitable second service representative for a period of time.

9. The non-transitory computer-readable medium of claim 8, wherein determining the customer sentiment metric comprises determining a numerical score indicative of the level of customer satisfaction.

10. The non-transitory computer-readable medium of claim 9, wherein the method further comprises:
   updating the numerical score at least once during the voice call to determine an updated numerical score;
   comparing the updated numerical score to a threshold value; and
   joining the second representative communications device to the voice call based at least in part on a determination that the updated numerical score is below the threshold value.

11. The non-transitory computer-readable medium of claim 8, wherein the method further comprises updating the customer profile based on an outcome of the voice call.

\* \* \* \* \*